United States Patent [19]

Lee

[11] Patent Number: 5,381,283
[45] Date of Patent: Jan. 10, 1995

[54] TAPE LOADING APPARATUS

[75] Inventor: Pil-hong Lee, Suwon, Rep. of Korea

[73] Assignee: Samsung Electronics Co., Ltd., Kyungki, Rep. of Korea

[21] Appl. No.: 932,546

[22] Filed: Aug. 20, 1992

[30] Foreign Application Priority Data

Sep. 26, 1991 [KR] Rep. of Korea ............... 9116818

[51] Int. Cl.⁶ ................ G11B 5/027; G11B 5/008
[52] U.S. Cl. ................................. 360/85; 360/95
[58] Field of Search ............ 360/85, 95; 242/194, 242/197

[56] References Cited

U.S. PATENT DOCUMENTS

| | | | |
|---|---|---|---|
| 4,912,578 | 3/1990 | Katohno et al. | 360/85 |
| 4,975,793 | 12/1990 | Oka | 360/85 |
| 5,025,331 | 6/1991 | Hirayama et al. | 360/85 |
| 5,086,359 | 2/1992 | Tsuchiya | 360/85 |

FOREIGN PATENT DOCUMENTS

| | | | |
|---|---|---|---|
| 87952 | 9/1983 | European Pat. Off. | 360/85 |
| 12518 | 1/1980 | Japan | 360/85 |
| 147848 | 9/1983 | Japan | 360/95 |
| 113567 | 6/1984 | Japan | 360/85 |
| 188772 | 8/1986 | Japan | 360/95 |
| 3-37850 | 2/1991 | Japan | |
| 3-152703 | 6/1991 | Japan | |

*Primary Examiner*—Robert S. Tupper
*Assistant Examiner*—Allen Cao
*Attorney, Agent, or Firm*—Sughrue, Mion, Zinn, Macpeak & Seas

[57] ABSTRACT

A tape loading apparatus in a tape recorder having a deck mechanism in which a rotary type head drum is provided, the tape loading apparatus having a half-loading function and a full-loading function for a corresponding VISS mechanism, and is constructed so that moving tape guiders are moved to a half-loaded location or a fully loaded location by virtue of the difference in diameters between a driving gear member and driven gear member, and the respective idly rotating portions provided thereon. In another embodiment the apparatus includes a half-loading gear, a driving gear member in which the half-loading gear is idly rotatably installed, a driven gear member which is the same shape and size as that of the driving gear member, and a gear driving member in which a gear portion is engaged stepwise and selectively with the driving and driven gear members, whereby moving tape guiders are moved to a half-loaded location and a fully loaded location.

19 Claims, 9 Drawing Sheets

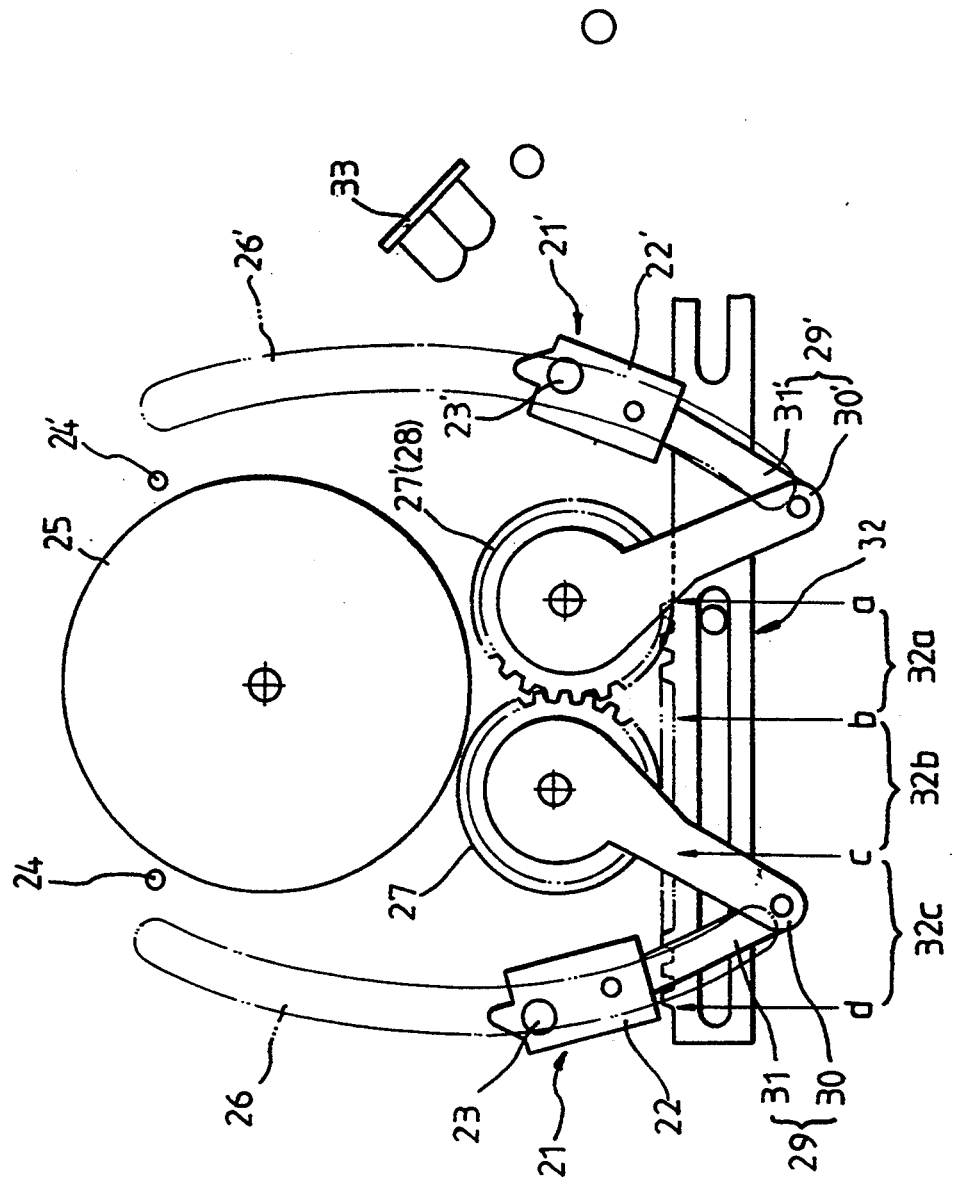

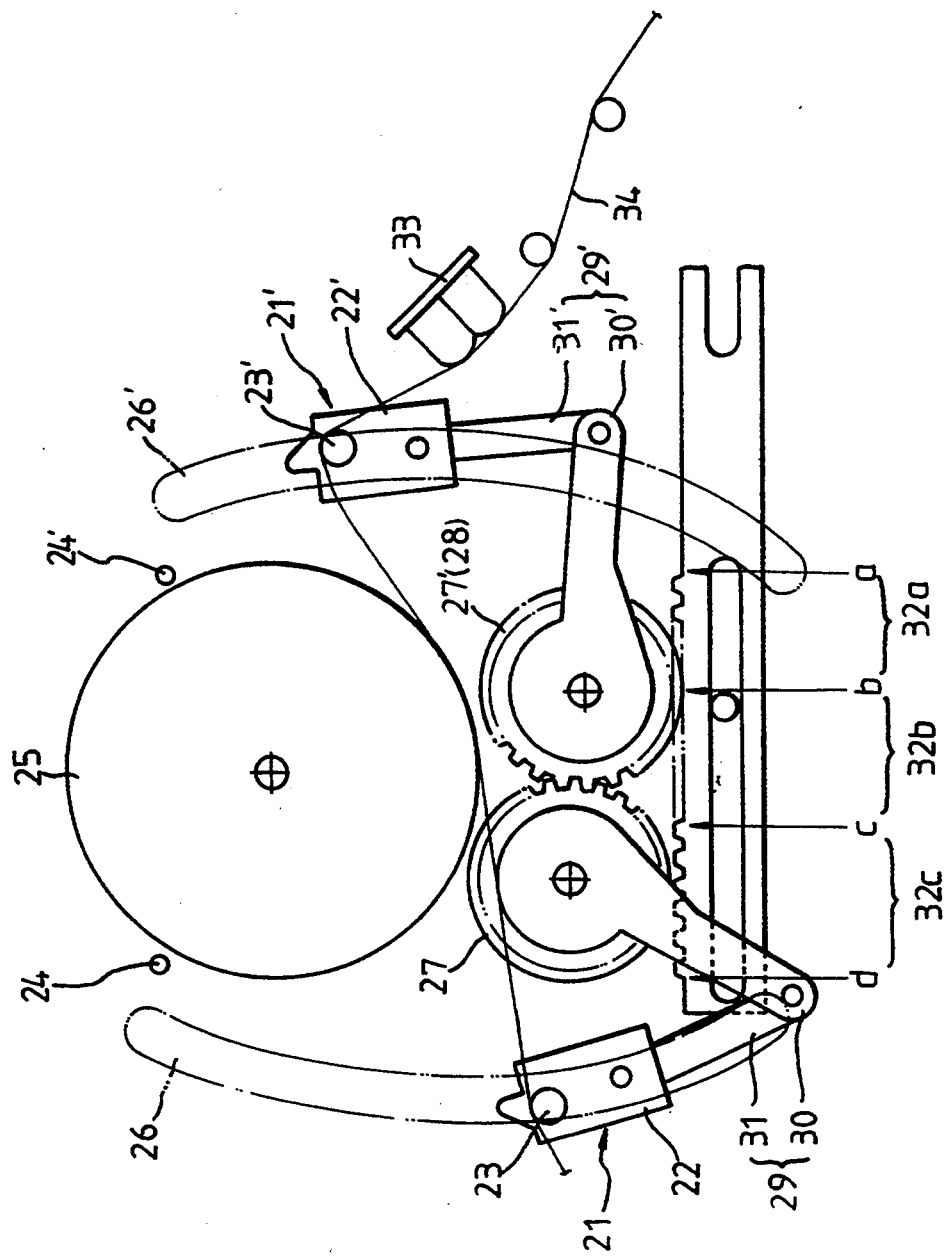

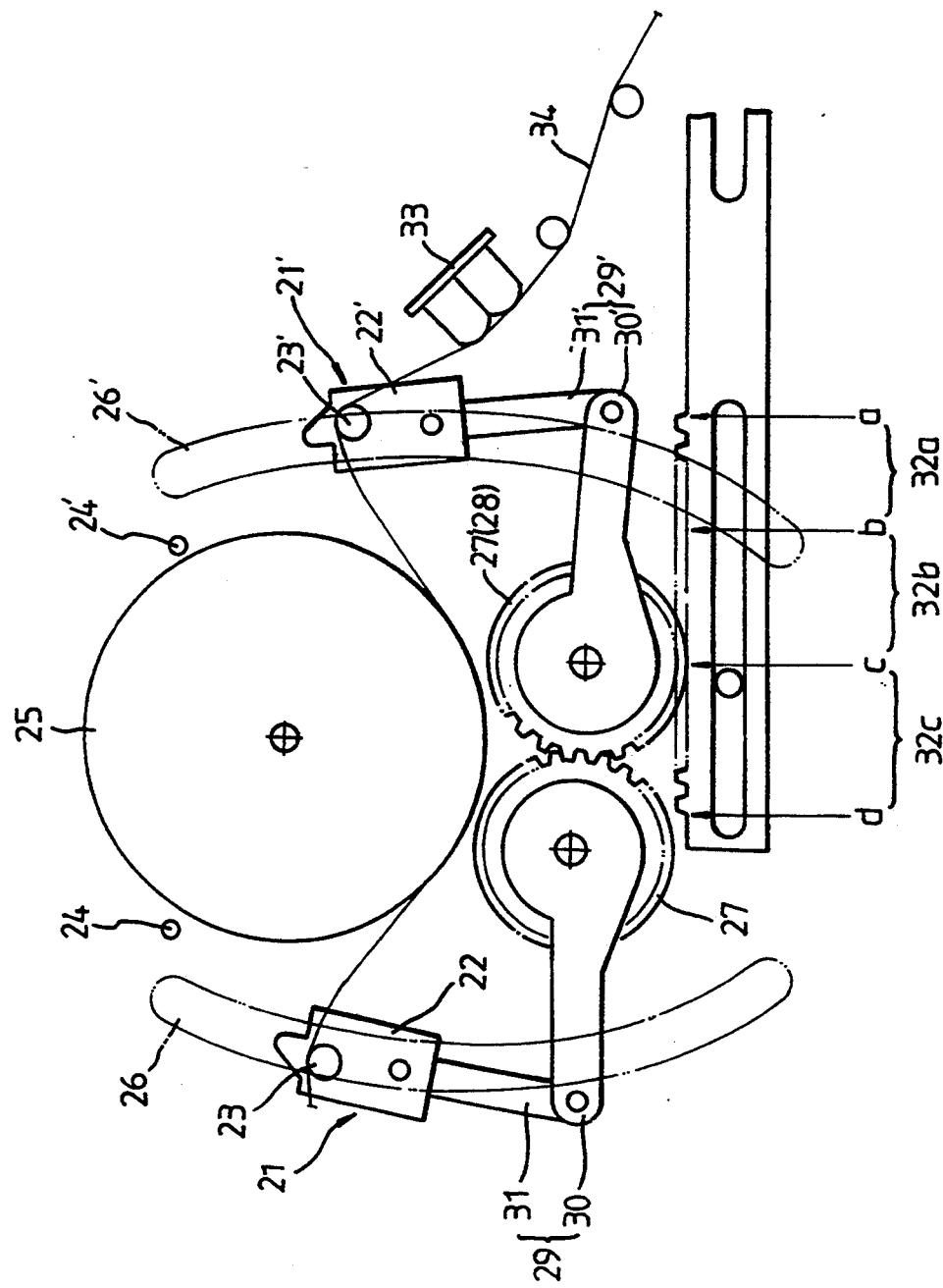

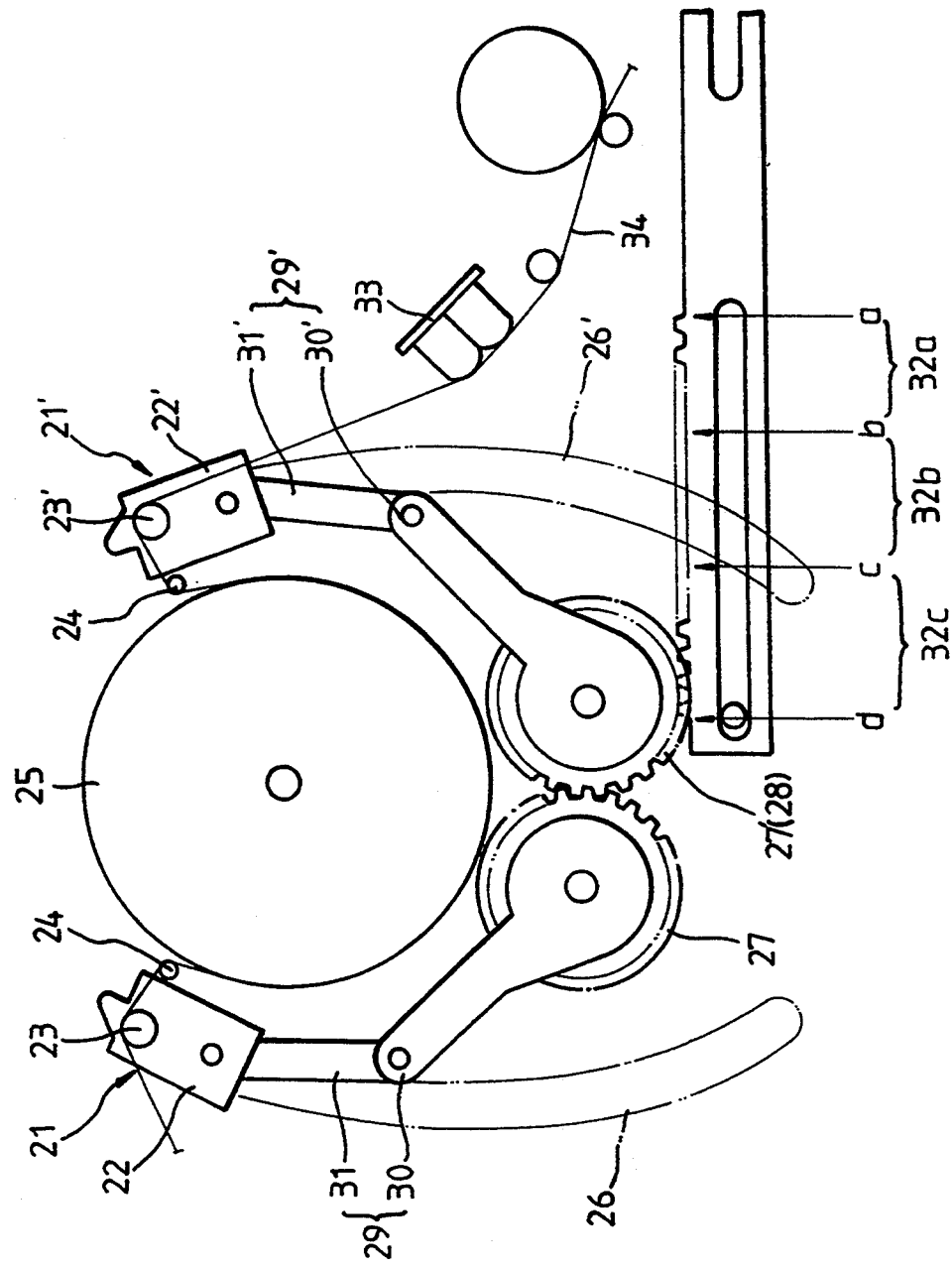

TAPE LOADING APPARATUS

FIELD OF THE INVENTION

The present invention relates to a tape loading apparatus in which the tape in a cassette is pulled out so that the pulled-out tape is wound onto a head drum for use in a tape recorder having a deck mechanism provided on a rotary type head drum. More particularly, the invention relates to a tape loading apparatus having both a half-loading function and a full-loading function for the deck mechanism corresponding to a video index search system (VISS).

BACKGROUND OF THE INVENTION

Generally, a magnetic recording and/or reproducing apparatus having a rotary type head drum such as in a video tape recorder or a digital audio tape recorder, is provided with a tape loading mechanism having a moving guider for guiding a tape run in which the tape is pulled out from a cassette that is loaded into the deck, and then makes close contact with the head drum at a predetermined slope. Also, the deck mechanism corresponding to the VISS is provided with a half-loading mechanism in which the tape makes only slight contact with the control head, thereby enabling the tape to run at a high speed.

One example of such a VISS deck mechanism can be found in the Japanese Laid-open Utility Model Publication No. Hei 2-84143 which discloses a full-loading apparatus for loading the tape on the rotary head drum and a half-loading apparatus for loading the tape on a control head. Both of these apparatuses are separately fabricated and installed. Accordingly, the deck mechanism becomes complicated, thereby increasing its cost, as well as making its design and assembly difficult. Further, since this leads to increased errors in assembly, poor quality or malfunctioning products are frequently produced. Accordingly, product reliability is lowered.

SUMMARY OF THE INVENTION

Therefore, it is an object of the present invention to provide a tape loading apparatus for use in a video tape recorder which performs the above-mentioned full-loading and half-loading functions with a single mechanism thereby improving an existing loading mechanism with which a tape is in close contact with a head drum.

According to a first embodiment of the present invention, there is provided a tape loading apparatus including two gear members which rotatably engage with each other, wherein two tape movement guides are respectively connected with the gear members, and one of the tape guides is driven, comprising:

an idle rotating portion in which a driving gear member and a driven gear member of the two gear members have different diameters, and simultaneously, are idly rotated within a predetermined angle, whereby when the idly rotating portion is idly rotated in a loading direction, the tape guider connected with the driving gear member is moved towards a half-loaded location, and when the idly rotating portion is not idly rotated in the loading direction, both tape guides are moved to a full-loaded location.

According to a second embodiment of the invention, there is provided a tape loading apparatus including two gear members which rotatably engage with each other, wherein two tape movement guides are connected with the gear members and one of the gear members is driven, comprising:

a half-loading gear which is idly rotatably installed on an axis of the driving gear member of the two gear members;

connection members in which two tape guides are moved within a predetermined interval, respectively, by means of the driven gear member of the two gear members and the half-loading gear; and a gear driving member in which a gear portion engaged only with the half-loading gear, a gear portion engaged only with the driving gear member and a gear portion commonly engaged with both the half-loading gear and the driving gear member, are formed in a predetermined interval and in turn, selectively drive the two gear members and half-loading gear by means of a driving source, whereby a tape is loaded stepwise by means of the tape movement guides.

According to the first embodiment of the present invention, the tape movement guide is moved stepwise to a half-loading and a full-loading location by means of the difference in diameters between the driving gear member and the driven gear member, and an idly rotating portion provided on both the driving and driven gear members when the driving gear member is rotated in a loading direction. Thus, a separate half-loading mechanism is not required.

Also, according to the second embodiment of the present invention, the tape guide is moved selectively and stepwise to the half-loaded and fully loaded locations by means of the movement of the gear member having a gear portion which engages selectively and stepwise with the driving gear member, the driven gear member and half-loading gear being of the same shape and size. Thus, a separate half-loading mechanism is not needed in the present invention.

BRIEF DESCRIPTION OF THE DRAWINGS

The above objects and other advantages of the present invention will become more apparent by the following detailed description of the preferred embodiment of the present invention with reference to the attached drawings in which:

FIG. 3A is a plan view showing the unloaded state of a tape loading apparatus according to the second embodiment of the present invention;

FIG. 3B is a plan view showing the half-loaded state of a tape loading apparatus according to the second embodiment of the present invention;

FIG. 3C is a plan view showing an intermediate state of a tape loading apparatus according to the second embodiment of the present invention;

FIG. 3D is a plan view showing the full-loaded state of a tape loading apparatus according to the second embodiment of the present invention;

DETAILED DESCRIPTION OF THE PREFERRED EMBODIMENTS

Figure 1A:
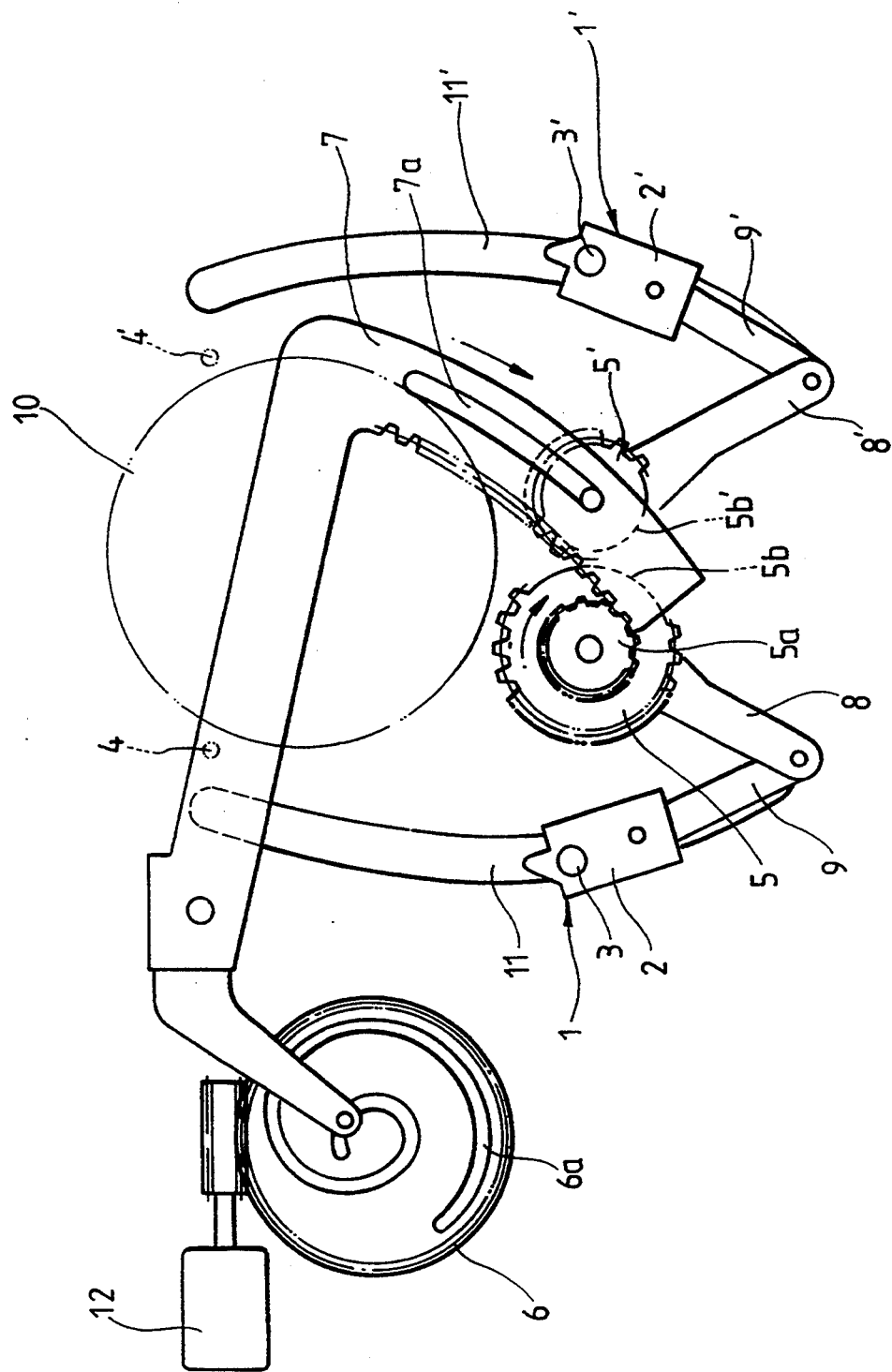
FIG. 1A is a plan view showing the unloaded state of a tape loading apparatus according to the first embodiment of the present invention.
Figure 1B:
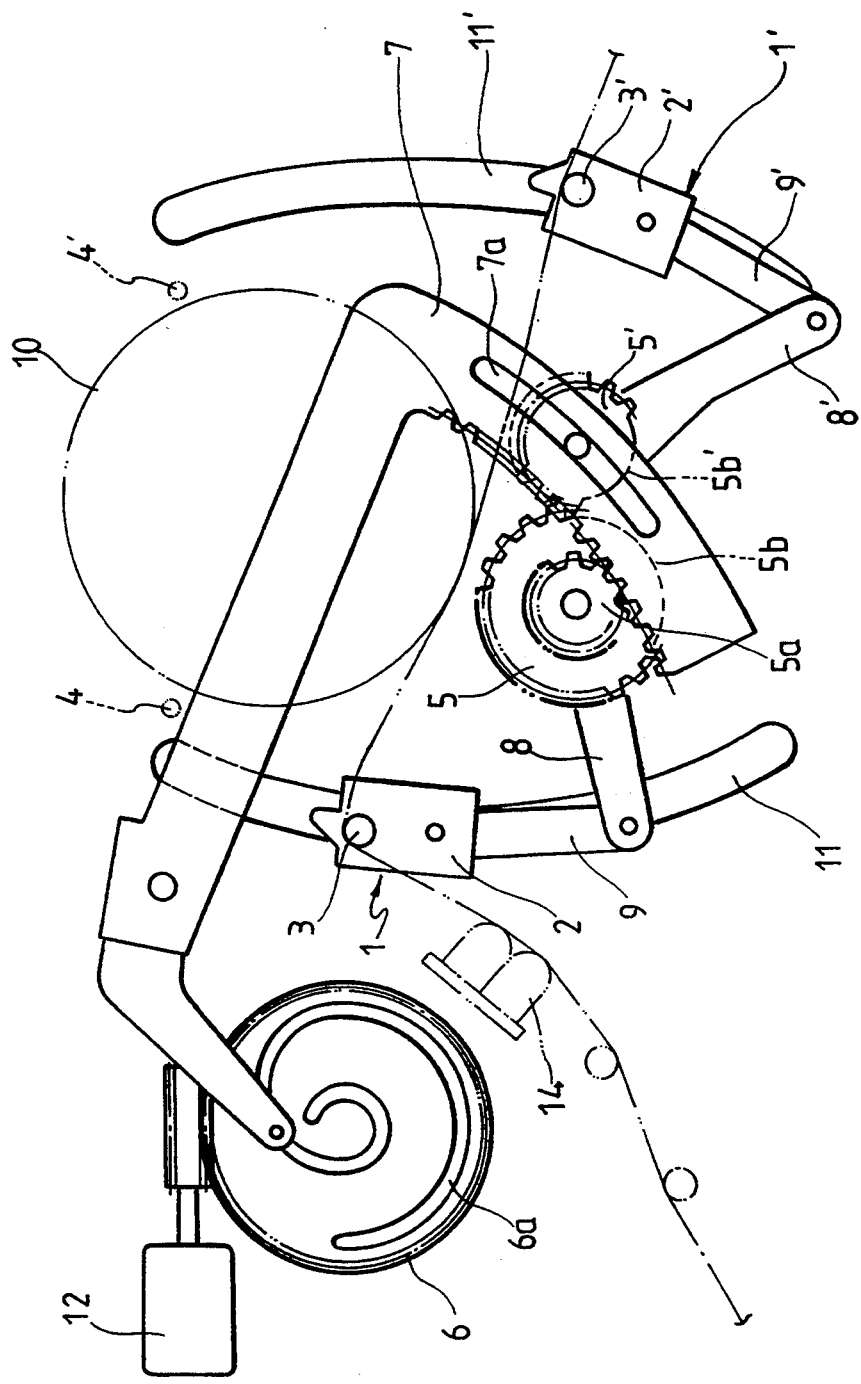
FIG. 1B is a plan view showing the half-loaded state of a tape loading apparatus according to the first embodiment of the present invention.
Figure 1C:
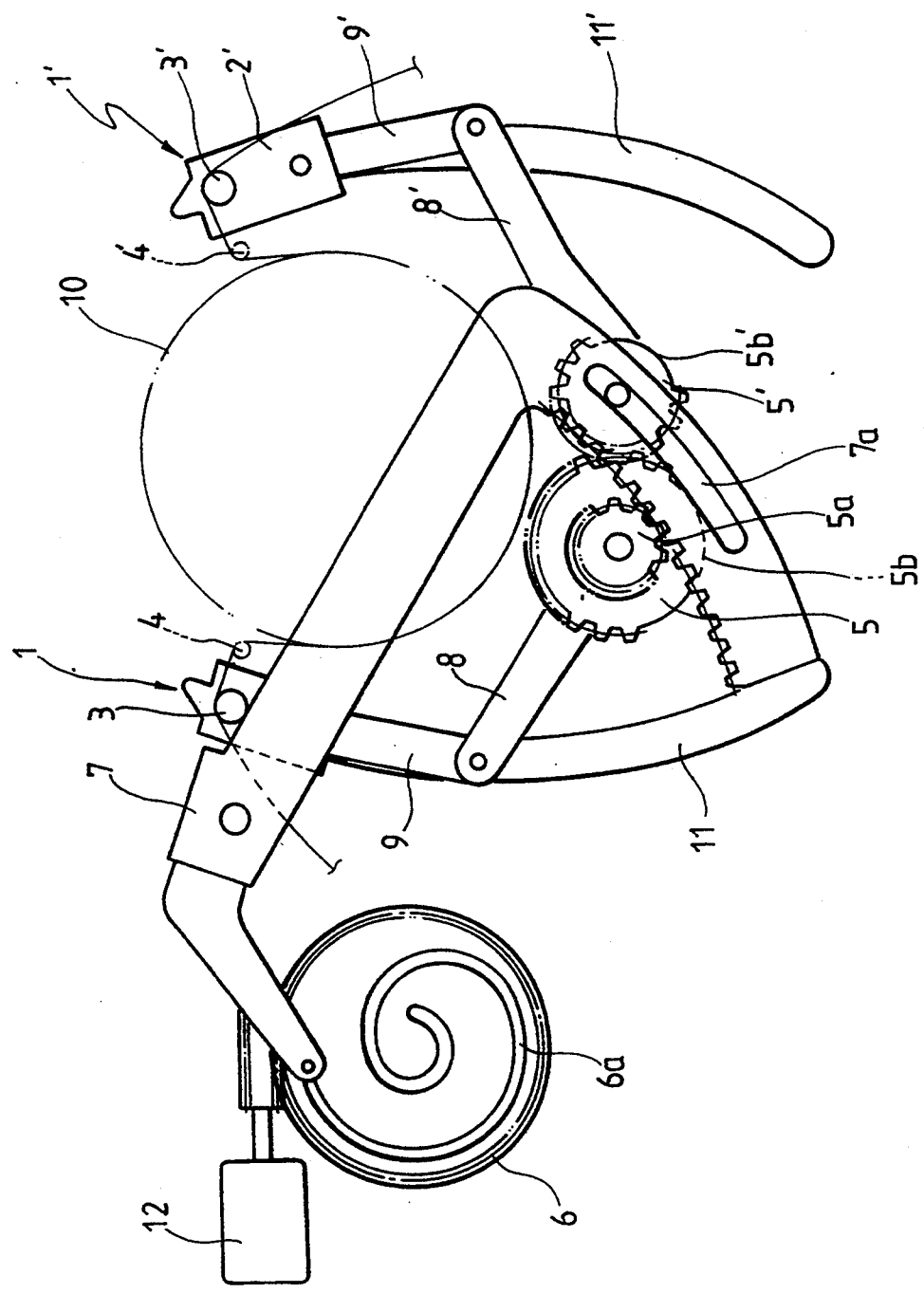
FIG. 1C is a plan view showing the full-loaded state of a tape loading apparatus according to the first embodiment of the present invention.
Figure 2:
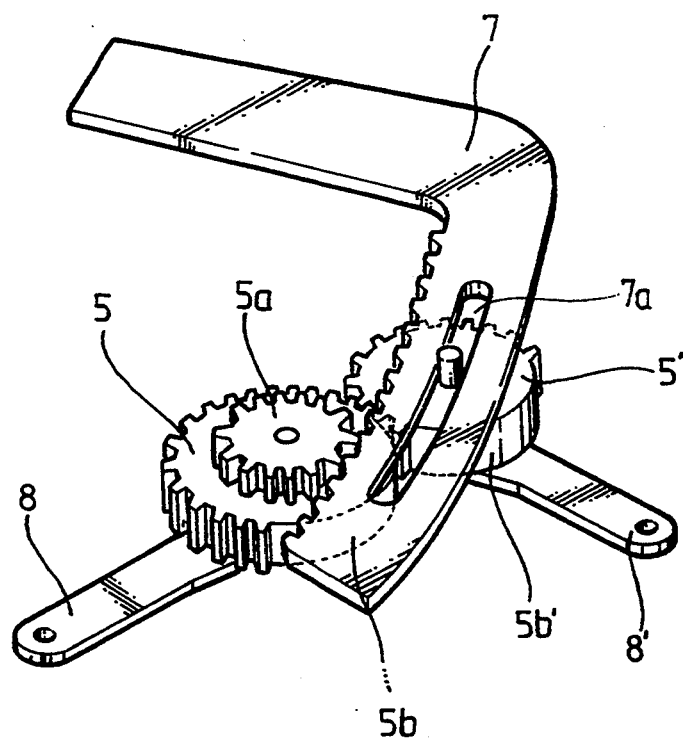
FIG. 2 is a perspective view of essential elements extracted from the apparatus shown in FIGS. 1A to 1C.

FIGS. 1A, 1B, 1C and 2 show a tape loading apparatus according to a first embodiment of the invention. FIGS. 1A, 1B, and 1C show the unloaded, half-loaded and fully-loaded states, respectively, while FIG. 2 is a perspective view of two gear members and a driving pinion of FIG. 1.

Referring to FIGS. 1A, 1B, 1C and 2, tape movement guides 1 and 1', respectively, include pole bases 2 and 2', and guide rollers 3 and 3' are provided on the upper surfaces of the pole bases 2 and 2'. The tape movement guides 1, 1' are disposed so as to move along guide grooves 11 and 11', respectively, provided on either side of head drum 10.

Slant poles 4 and 4' are fixedly installed adjacent to head drum 10. Further, take-up loading gear 5, as the driving gear member, and supply loading gear 5', as the driven gear member, are installed in front of head drum 10 so as to rotatably engage each other. Disposed on the upper portion of take-up loading gear 5 is an integrally formed driving pinion 5a. A substantially L-shaped sector gear 7 is disposed so as to rotatably move along a curved cam groove 6a of a cam gear 6 which is driven by a conventional motor 12. The sector gear 7 is provided with teeth that are engaged with driving pinion 5a. The sector gear 7 is also provided with an elongated guide slot 7a into which a central pin of supply loading gear 5' is inserted, and along which the supply loading gear 5' is moved.

The diameter of the take-up loading gear 5 is larger than that of supply loading gear 5'. The take-up gear 5 and supply loading gear 5' are provided with idly rotating portions 5b and 5b' which allow for idle rotation within a predetermined angle or interval. Specifically, as shown in FIGS. 1A-1C and 2, the idly rotating portions 5b and 5b' are smooth or non-toothed portions. The take-up loading gear 5 is connected to pole base 2 by means of arm 8 and link 9. On the other hand, the supply loading gear 5' is connected to the pole base 2' by means of arm 8' and link 9'.

The respective diameters of take-up loading gear 5 and supply loading gear 5' are set so as to provide a predetermined difference therebetween. Since the pinion 5a of take-up loading gear 5 is driven by sector gear 7 when loading gears 5 and 5' are idly rotated by the idly rotating portions 5b and 5b', tape guide 1 (which is connected with take-up loading gear 5, preloaded by a predetermined distance) and tape guide 1' are moved simultaneously to the fully loaded location when the loading gears 5 and 5' are engaged.

The tape loading apparatus having the above-mentioned construction operates as follows.

In the unloaded state as shown in FIG. 1A, sector gear 7 is rotated in a direction of the arrow along curved cam groove 6a of cam gear 6 which is rotated by the drive motor 12. Specifically, sector gear 7 rotates when the pin disposed within cam groove 6a moves from the concentric portion thereof to an eccentric portion thereof. As shown in FIG. 1A, the pin within cam groove 6a is initially disposed in a concentric portion of cam groove 6a. Sector gear 7 is stably rotated by means of elongated guide slot 7a formed therein and the pin of supply loading gear 5' which is inserted into elongated slot 7a. When sector gear 7 is rotated, driving pinion 5a which is engaged with sector gear 7 is also rotated, and the take-up loading gear 5 in which driving pinion 5a is integrally formed is rotated clockwise (as shown by the arrow of FIG. 1A) by a predetermined angle. In this case, supply loading gear 5' is not rotated (i.e., it idles) due to idly rotating portions 5b and 5b', and therefore only the take-up tape movement guide 1 is moved to the half-loaded location as shown in FIG. 1B. Thus, tape 13 (FIG. 1B) passes by guide roller 3 of tape movement guide 1 and then makes contact with an audio/control head 14, thereby enabling high speed search operation via the VISS function.

Next, when sector gear 7 is further rotated clockwise to thereby rotate driving pinion 5a, take-up loading gear 5 which is coupled to driving pinion 5a is rotated clockwise, causing the teeth of the take-up loading gear 5 to engage with the teeth of supply loading gear 5'. As a result, loading gears 5 and 5' are simultaneously rotated. At this time, since the diameter of take-up loading gear 5 is larger than that of supply loading gear 5', the number of revolutions of supply loading gear 5' within a given time is larger than that of take-up loading gear 5, due to the difference of their respective diameters. Therefore supply tape movement guide 1' will rotate faster than take-up tape movement guide 1. Since the movement of supply tape movement guide 1' is faster than that of take-up tape movement guide 1 which has been moved to the half-loaded location, loading gears 5 and 5' are simultaneously moved to the full-loaded location as shown in FIG. 1C. The unloading operation proceeds in a reverse manner with respect to the above-described loading operation.

Figure 4:
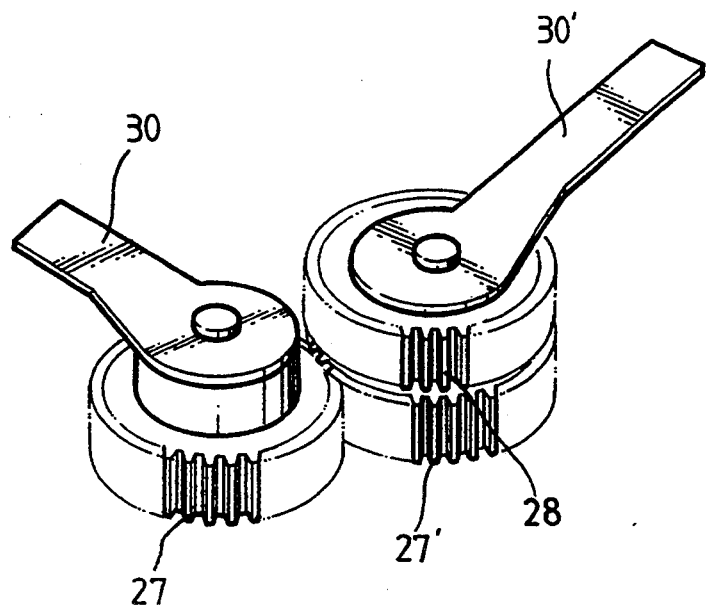
FIG. 4 is a perspective view of essential elements from the apparatus shown in FIGS. 3A to 3D.
Figure 5:
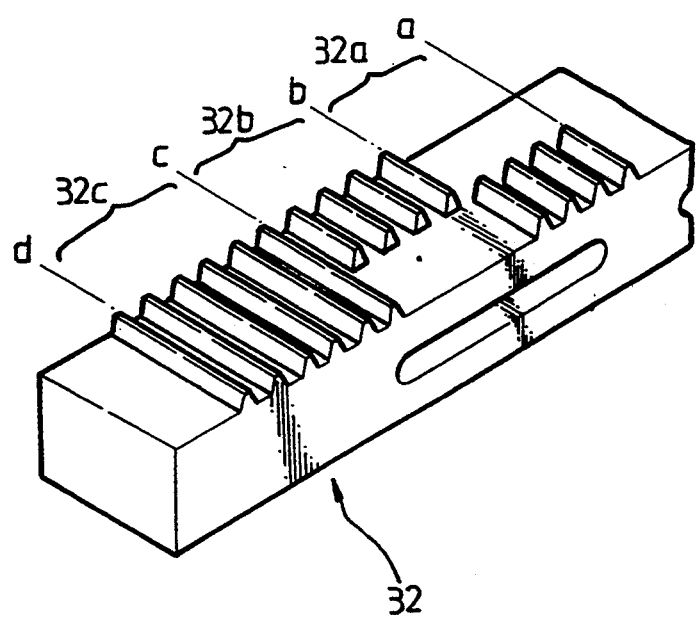
FIG. 5 is a perspective view of the gear driving member shown in FIGS. 3A-3D.

FIGS. 3A-3D, 4 and 5 show another embodiment of the present invention. FIGS. 3A-3D show the unloaded, half-loaded, intermediate, and fully-loaded states, respectively, while FIG. 4 is a perspective view showing two gear members and the half-loading gear of FIG. 3. FIG. 5 is a perspective view showing the gear driving member of FIG. 3.

Referring to FIGS. 3A-3D, 4 and 5, a pair of tape movement guides 21 and 21' include pole bases 22 and 22', and guide rollers 23 and 23' are provided on the upper surfaces of the pole bases 22 and 22'. The tape movement guides 21 and 21' are movably installed along guide grooves 26 and 26', respectively, provided on either side of head drum 25. Further, slant poles 24 and 24' are fixedly installed adjacent to head drum 25.

The take-up loading gear 27', as the driving gear member, and supply loading gear 27, as the driven gear member, are disposed in front of head drum 25. The loading gears 27, 27' have the same shape and size as shown in FIG. 4. The take-up loading gear 27' and supply loading gear 27 are engaged with each other, and a half-loading gear 28 is coaxially and idly rotatably installed on the upper portion of take-up loading gear 27'.

A pair of connection members 29 and 29' include arms 30 and 30' which are hinged to links 31 and 31', respectively. Arm 30 and link 31 of connection member 29 are connected with the supply loading gear 27 and pole base 22, respectively. The other arm 30' and link 31' of connection member 29' are connected with the take-up half-loading gear 28 and pole base 22', respectively.

Further, gear driving member 32 is disposed to allow for rectilinear motion, so as to rotate take-up loading gear 27' and half-loading gear 28 which are disposed on the same vertical axis. As shown in FIG. 5, gear driving member 32 includes a first gear portion 32a which is formed on the upper half portion of interval a-b and with which only half-loading gear 28 engages, a second gear portion 32b which is formed on the lower half portion of interval b-c and with which only take-up loading gear engages, and a third gear portion 32c which is formed on the whole portion of interval c-d and with which loading gears 27 and 28 engage simultaneously.

The operation of the tape loading apparatus having the above-mentioned construction will now be described.

In the unloaded state as shown in FIG. 3A, gear driving member 32 is moved to the right side by a drive source (not shown). As a result, half-loading gear 28 is rotatably engaged with the first gear portion 32a of gear driving member 32. At this time, since take-up loading gear 27' and supply loading gear 27 are not rotated, only take-up tape movement guide 21' is moved to the half-loaded location as shown in FIG. 3B. As shown in FIG. 3B, in the half-loaded state, tape 34 passes by guide roller 23' of tape movement guide 21' and then makes contact with the audio/control head 33, thereby enabling high speed search operation via the VISS function.

Next, take-up loading gear 27' is rotatably engaged with the second gear portion 32b of gear driving member 32, and at the same time, supply loading gear 27 is rotated. At this time, since half loading gear 28 stops, supply moving tape guide 21 is moved to the half-loaded location and tape guide 21' does not move as shown in FIG. 3C. Thereafter, loading gears 27 and 27' and half loading gear 28 are all rotated by means of the third gear portion 32c of gear driving member 32 engaging both driving gear 27' and half-loading gear 28, to thereby move tape guides 21 and 21' to the fully-loaded state as shown in FIG. 3D.

As discussed above, tape guider 21 and 21' are loaded stepwise and selectively. By controlling the moving interval of gear driving member 32, it is possible to first half-load and then fully- load the tape.

The unloading operation of the tape is performed by the reverse movement of gear driving member 32.

As described above, the tape loading apparatus according to the present invention does not use the separate half-loading mechanism, and instead improves the existing tape loading mechanism, to thereby provide a tape loading apparatus having both the full-loading and half-loading functions. Accordingly, the present invention can reduce cost, while simplifying design and assembly, as well as reduce the frequency of malfunction of the VISS mechanism, thereby improving product reliability.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A tape loading apparatus having a rotary head drum wherein a tape is extracted from a cassette and wrapped around at least a portion of the rotary head drum during a loading operation, said apparatus first performing a half-loading operation, wherein the tape is placed in contact with a relatively small portion of the rotary head drum, and then a fully-loading operation, wherein the tape is placed in contact with a relatively large portion of the rotary head drum, the apparatus comprising:

a pair of tape movement guides;

a pair of gear members each coupled to a different one of said tape movement guides; and drive means coupled to said pair of gear members for driving said pair of gear members such that during the half-loading operation, one of said gear members moves one of said tape movement guides from a first position which is remote from said rotary drum head to a half-loaded position to accomplish said half-loading operation, and the other one of said gear members idles so that the other one of said tape movement guides remains at a second position which is remote from the rotary drum head, and then during the fully-loading operation each of said gear members moves to move each of said tape movement guides to accomplish said fully-loading operation.

2. The tape loading apparatus as defined in claim 1, wherein said gear members are meshingly engaged with each other and respective diameters of said pair of gear members are different from each other such that during the fully-loading operation said other one of said gear members moves faster than said one of said gear members, thereby simultaneously moving said tape movement guides to the fully-loaded position.

3. The tape loading apparatus as defined in claim 2, wherein said drive means comprises a drive motor, a cam coupled to said drive motor, and a sector gear coupled to said cam and to said pair of gear members.

4. The tape loading apparatus as defined in claim 3, wherein said cam includes a cam groove having concentric and eccentric portions, and wherein said sector gear is coupled to the cam groove of said cam and includes a slot and a teeth portion.

5. The tape loading apparatus as defined in claim 4, wherein said other one of said gear members is coupled to the slot of said sector gear.

6. The tape loading apparatus as defined in claim 5, wherein said one of gear members includes a drive pinion having a teethed portion which is coupled to the teeth of said sector gear.

7. The tape loading mechanism as defined in claim 1, further comprising a pair of connecting elements for connecting said pair of tape movement guides to said pair of gear members, respectively.

8. The tape loading mechanism as defined in claim 7, wherein each of said pair of connecting elements comprises an arm and a link pivoted to an end of said arm.

9. The tape loading mechanism as defined in claim 1, wherein each of said gear members includes a driving portion and an idle portion, wherein the driving portion of said gear members comprises teeth, and wherein the idle portion of said gear members comprises a substantially smooth surface.

10. A tape loading apparatus having a rotary head drum wherein a tape is extracted from a cassette and wrapped around at least a portion of the rotary head drum during a loading operation, said apparatus first performing a half-loading operation, Wherein the tape is placed in contact with a relatively small portion of the rotary head drum, then an intermediate loading operation, wherein the tape is placed in contact with a portion of the rotary drum head which is larger than during a half-loading operation, and finally a fully loading-operation, wherein the tape is placed in contact with a relatively large portion of the rotary head drum which is larger than that of the half-loading operation and the intermediate loading operation, the apparatus comprising:

- a pair of tape movement guides;
- a pair of gear members, each coupled to a different one of said tape movement guides, each of said gear members having a driving portion, and said gear members being rotatably engaged with each other;
- a half-loading gear installed on one of said gear members; and
- drive means coupled to said one of said pair of gear members, and to said half-loading gear for driving said gear members such that during the half-loading operation only one of said tape movement guides moves from a first position, which is remote from said rotary drum head, to a half-loading position to accomplish said half-loading operation then during the intermediate-loading operation, the other one of said tape movement guides moves from a second position, which is remote from said rotary drum head, to a half-loading position to accomplish said intermediate-loading operation, and said one tape guide does not move, and finally during said fully-loading operation said pair of tape guides simultaneously move to the fully-loading position to accomplish said fully-loading operation.

11. The tape loading apparatus as defined in claim 10, wherein said drive means comprises a linear gear having a plurality of different drive portions.

12. The tape loading apparatus as defined in claim 11, wherein said linear gear further has a plurality of different idle portions.

13. The tape loading apparatus as defined in claim 11, wherein said linear gear has a first drive portion, and wherein during the half-loading operation the first drive portion drives only said half-loading gear, thereby moving only said one of said gear members to the half-loading position.

14. The tape loading apparatus as defined in claim 13, wherein said linear gear has a second driving portion different from the first driving portion, and wherein during the intermediate-loading operation, the second drive portion drives only said one of said gear members so as to cause rotation of both of said rotatably-engaged gear members, thereby moving only said other one of said tape movement guides to the half-loading position.

15. The tape loading apparatus as defined in claim 14, wherein said linear gear has a third driving portion which is different from the first and second driving portions, and wherein during the fully-loading operation, the third driving portion drives said half-loading gear and said one of said gear members so that said pair of tape movement guides are simultaneously moved to the fully-loading position.

16. The tape loading apparatus as defined in claim 15, wherein each of the first, second and third driving portions of said linear gear comprises teeth.

17. The tape loading apparatus as defined in claim 16, wherein said linear gear further has first and second idle portions disposed adjacent said first and second driving portions, respectively, the first idle portion allowing idle rotation of said one gear member during the half-loading operation, the second idle portion allowing idle rotation of said half-loading gear during the intermediate-loading operation.

18. The tape loading apparatus as defined in claim 10, wherein a shape and diameter of said pair of gear members are substantially the same.

19. The tape loading apparatus as defined in claim 10, wherein said drive means comprises a linear gear, and wherein said linear gear has a plurality of teeth and smooth portions on a surface thereof.

* * * * *